Aug. 12, 1947.  J. D. BOLESKY ET AL  2,425,668
MOTOR STARTING AND PROTECTIVE APPARATUS
Filed Dec. 20, 1943
FIG. 1.
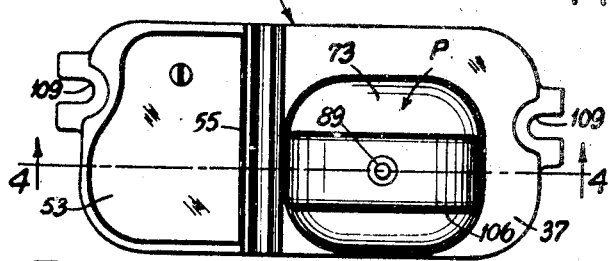
FIG. 2.
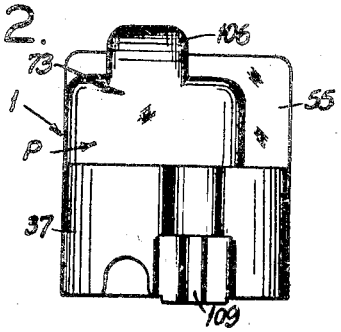
FIG. 3.
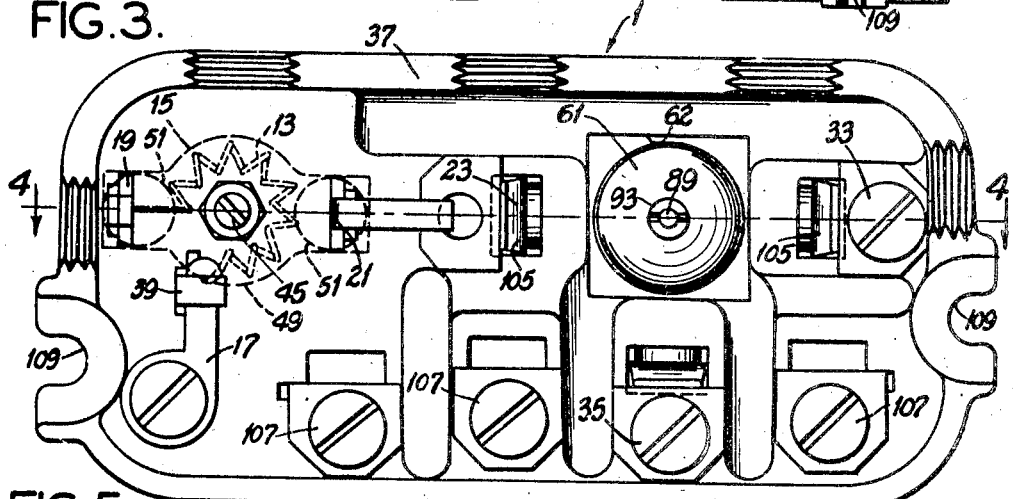
FIG. 5.
FIG. 4.
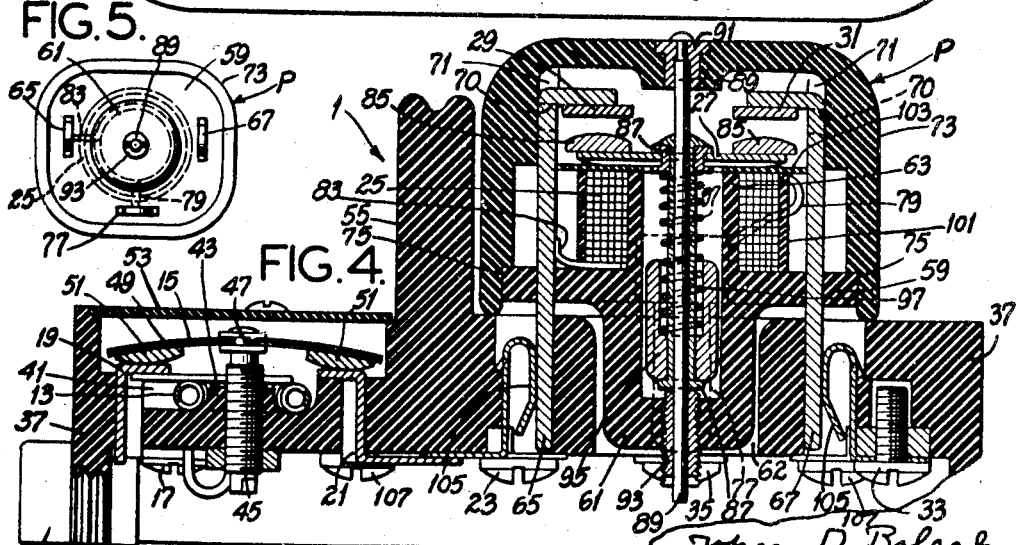
FIG. 6.
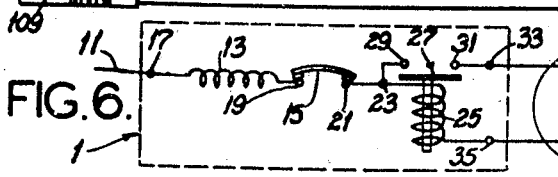
John D. Bolesky,
Lewis W. Buell,
Inventors.
Haynes and Koenig
Attorneys.

Patented Aug. 12, 1947

2,425,668

UNITED STATES PATENT OFFICE 2,425,668

MOTOR STARTING AND PROTECTIVE APPARATUS

John D. Bolesky and Lewis W. Buell, Attleboro, Mass., assignors to Metals & Controls Corporation, Attleboro, Mass., a corporation of Massachusetts Application December 20, 1943, Serial No. 515,012

6 Claims. (Cl. 172—279)

This invention relates to motor protective apparatus, and with regard to certain more specific features to such apparatus which is particularly applicable to motor driven devices requiring fast testing and servicing.

Among the several objects of the invention may be noted the provision of a motor protective unit incorporating a thermostatic cut-out and a phase relay so arranged that tests, repairs and replacements required may quickly be made without confusing operations; and the provision of apparatus of this class which is particularly applicable to installations of the class such as domestic refrigerators and the like which often require quick, accurate and effective servicing in the field. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a top plan view of a unit embodying the invention;

Fig. 2 is a right-end view of Fig. 1;

Fig. 3 is a bottom plan view on an enlarged scale;

Fig. 4 is a vertical longitudinal section taken on line 4—4 of Figs. 1 and 3;

Fig. 5 is a bottom plan view of a plug part shown in the other figures, being on the scale of Figs. 1 and 2; and Fig. 6 is a wiring diagram.

Similar reference characters indicate corresponding parts throughout the several views of the drawings.

As an example of the application of the invention, a home refrigerating unit is used hereinafter, but it is to be understood that the invention is applicable to any electrical units involving quick servicing problems. In the said refrigerating units a motor is used for driving the refrigerant compressor. This motor should be equipped with protective apparatus to guard against burn-outs. Also, since the motor used generally has a main and a phase winding, it requires a phase relay switch for starting purposes. This means that relatively complex wiring is required for the combination of the motor protective switch and the phase relay switch, troubles in which are difficult to trace when making ordinary repairs in the field. Since it is not desirable that the apparatus be laid up very long for repairs, as by taking it to a shop for minute dissection, we have found that it is advantageous to have an organization of parts for these starting and protective elements which may be repaired quickly and effectively, under the usually adverse field conditions.

Referring now more particularly to Fig. 1, there is shown in general at numeral 1 the unit which forms the subject of the invention. This is also indicated by the dotted lines in Fig. 6.

The protected motor 3 has a main winding 5 and a phase winding 7 connected in parallel to one side of the line at 9. The phase winding 7 is used only during starting operations and is to be cut out of circuit as the motor reaches driving speed. The other side of the line is indicated at 11 and connected to it is a heater coil 13 of a thermostatic switch 15. The heater coil is connected to the line 11 at a terminal 17 and to the switch 15 at a terminal 19. The other terminal 21 of the switch 15 connects with the terminal 23 of a coil 25 belonging to a magnetic relay switch 27. The switch 27 upon energization of the coil 25 closes points 29 and 31, the latter being wired to a terminal 33 for the phase coil 7. The coil 25 is wired to a terminal 35 for the main winding 5.

Electrical operation is broadly as follows:

Current passes through the heater coil 13, closed thermostat 15, terminal 23, coil 25, terminal 35, main winding 5 and back to the line at 9. This causes the switch 27 to rise and close points 29 and 31, thus energizing the phase winding 7. This starts the motor 3 which, as the back electromotive force builds up, reduces the current in the coil 25 to a point where the switch 27 drops open to cut the phase winding 7 out of operation. The motor then continues to run due to the energization of the main winding 5.

Should the motor become overloaded or stall due to any of various events which might occur, the heavier current drawn in the main winding 5 would cause overheating of the coil 13 with consequent operation of the thermostat 15 to open position, thereby cutting the motor out of operation.

The actual parts indicated within dotted lines in Fig. 6 are shown in Figs 1–5 and comprise a base 37 preferably of molded plastic. At 108 are hold-down eyes. Inserted in the bottom of the base are main terminals 17, 23, 33 and 35. Main terminal 17 is the line wire connection, and main terminals 33 and 35 are the motor connections. A conductor 39 joins the line wire connection 17 with the heater 13, the latter lying in a recess 41 and around a boss 43 on top of the insulating base 37. The other end of the heater coil 13 is connected with the terminal 19 of the thermostatic switch 15. The other terminal 21 of the thermostatic switch is conductively connected with the said main terminal 23.

The remainder of the thermostatic switch parts comprise an adjustable stem 45 threaded into the base 37. At its upper end the stem 45 is centrally joined as at 47 to a snap-acting thermostatic bimetal disc 49 of the so-called Spencer type. This disc carries contacts 51 which respectively engage the terminals 19 and 21 when the disc is cold and which disengage when the disc snaps to a hot open position, the heating being determined in part by the temperature of the coil 13 and in part by the current which flows in series through the disc 49. Above the disc 49 is a removable cover 53 permitting inspection, repair and replacement of the thermostatic switch parts.

A vertical wall 55, forming part of the base 37 separates the switch parts immediately above described, from the phase relay parts about to be described. These phase relay parts are in a removable plug formed of an insulating plastic base plate 59 having a lower protrusion 61 and a central cylinder 63. Through openings in this plate 59 pass conducting tines or terminal engaging elements 65 and 67 which at the upper ends have protrusions 70 resting in grooves 71. The upper ends are turned at right angles and constitute said terminals 29 and 31. The grooves 71 are formed in a cover 73 which tightly cooperates with the plate 59 at a groove 75. A third tine or terminal engaging element 77 also passes through the base plate 59 and on the inside of the cover 73 is wired, as indicated at 79, to the coil 25. Coil 25 is supported on disc 59 and around cylinder 63, being surrounded by suitable insulation 101, 103. The coil is also wired to the tine 65 as indicated at 83. Thus current flowing from the tine 65 to the tine 77 passes through the coil 25. Current may also pass from the tine 65 to the terminal 33 by way of the tine 67, provided the terminals 29 and 31 are bridged.

The terminals 29 and 31 are bridged by a conducting arm 27 carrying contacts 85, the conducting arm 27 being riveted to a cylindric slider 87 carried upon a fixed post 89. The post 89 is held in the top of the cover 73 as indicated at 91. At the lower end the post 89 passes through an adjustable sleeve 93 threaded through the extension 61. This sleeve 93 bears against the lower end of the slider 87 for adjusting the open clearance between the contacts 85 and terminals 29 and 31.

Sliding upon the member 87 is a cylindric armature 95 composed of magnetic material. This armature 95 is biased away from the conducting crossarm 27 by means of a light spring 97. Upon energization of coil 25, the armature 95 is drawn upward, thus compressing the spring 97 and forcing the contacts 85 into resilient engagement with the terminals 29 and 31. Any temporary vibratory action tending to separate the contact is absorbed by the spring 97. Thus the contact closes and remains shut upon the first closure, rather than vibrating open and shut for a time when operated.

The main terminals 23, 33 and 35 in the base 37 are provided with spring clips for engaging the tines 65, 67 and 77 respectively. Two of these spring clips are shown at 105 in Fig. 4. The details of these clips form the subject of a separate application by Lewis W. Buell, for Electrical terminal clips, filed September 4, 1943, S. N. 501,214, and in a continuing application of said Buell for Electrical terminal clip, filed July 14, 1944, S. N. 544,866. Their functions herein are springingly to engage the protruding tines 65, 67 and 77 of what will hereinafter be referred to as the removable plug P, constituted by the parts 73, 59 and elements contained therein. This plug is formed on the top with a grip portion 106, whereby the whole plug, containing all of the phase relay parts, may be removed at will and replaced. This is an important feature in the invention, since it allows a repairman to test the effectiveness of the whole phase relay unit simply by unplugging the plug P and replacing it with a new one known to be in working order. If the trouble that he is investigating disappears by this operation, it is at once known that there is trouble in the phase relay. Furthermore, the trouble may be cured at once by plugging in a new plug which is in good order. It will be noted that the extension not only provides space for the armature 95 but forms, with openings 62 in base 37 a plug guide.

Operation of the thermostatic unit may be quickly investigated by removing the cover 53.

Referring again to the base 37 of the device, it is to be understood that the additional terminals shown and not already referred to (and indexed 107) are carried on the base 37 for making other required connections which it is unnecessary to detail herein. The primary point is that the base carries various terminals, including 23, 33 and 35 which are necessary for the plug P, and the terminal 17 necessary for the thermostatic unit.

Since the relay switch contacts 85 open by gravity, the precaution needs to be observed in installing the apparatus that it be upright or nearly so as indicated in Fig. 4. Hence the phase relay plug will be in upright operating position when inserted.

By having the opening 62 between the terminals 23, 33 and 35, and by having the extension 61, which is between elements 65, 67 and 77, accommodated therein, compactness is obtained. Furthermore compactness is made greater by containing in the extension 61 the hollow portion for the moving armature, coil 25 being directly above. Therefore the plug, although it contains all of the phase switch parts is about the size of an ordinary wall plug.

In view of the above, it will be seen that the several objects of the invention are achieved and other advantageous results attained.

As many changes could be made in the above constructions and processes without departing from the scope of the invention, it is intended that all matter contained in the above description or shown in the accompanying drawings shall be interpreted as illustrative and not in a limiting sense.

We claim:

1. Magnetic switch apparatus comprising a base, said base having an opening, terminals in the base, a plug, terminal engaging elements extending from said plug for removable engagement with said base terminals, an extension on said plug adapted to be inserted into said opening, a switch in said plug and an electromagnetic coil therein, and an armature operating said switch controlled by said coil, said extension forming a hollow portion and accommodating the armature.

2. Main switch apparatus comprising a base having an opening, terminals in the base around said opening, a plug, an extension on said plug adapted to enter said opening, terminal engaging elements extending from said plug for removable engagement with said terminals, said extension being located between said terminal engaging elements, a switch in said plug and an electromagnetic coil therein, and an armature operating said switch controlled by said coil, said extension forming a hollow portion and accommodating the armature.

3. A motor starting and protective unit comprising a base, three terminals in the base, a plug, first, second and third terminal engaging elements carried by said plug and removably engageable with said terminals respectively, a relay switch in said plug comprising extensions from the first and second of said terminal engaging elements, movable switch contacts in the plug, a movable armature in said plug operating said contacts, an electromagnetic coil operative upon said armature, said coil being connected to the first and third of said terminal engaging elements, said base having an opening, an extension on said plug adapted to enter said opening, said extension forming a hollow portion and accommodating the armature, and a thermostatic switch carried on said base, said thermostatic switch being connected in circuit with one of said terminals.

4. A motor starting and protective unit comprising a base, three terminals in the base, a plug, first, second and third terminal engaging elements carried by said plug and removably engageable with said terminals respectively, a relay switch in said plug comprising extensions from the first and second of said terminal engaging elements, movable switch contacts in the plug, a movable armature in said plug operating said contacts, an electromagnetic coil operative upon said armature, said coil being connected to the first and third of said terminal engaging elements, said base having an opening, an extension on said plug adapted to enter said opening, said extension forming a hollow portion and accommodating the armature, a thermostatic switch carried on said base, said thermostatic switch being connected in circuit with one of said terminals, and a heater for said thermostatic switch adapted to be connected in circuit with the running winding of a motor.

5. A motor starting and protective unit comprising a base, three terminals in the base, a plug, first, second and third terminal engaging elements carried by said plug and removably engageable with said terminals respectively, a relay switch in said plug comprising extensions from the first and second of said terminal engaging elements, movable switch contacts in the plug, a movable armature in said plug operating said contacts, an electromagnetic coil operative upon said armature, said coil being connected to the first and third of said terminal engaging elements, said base having an opening, an extension on said plug adapted to enter said opening, said extension forming a hollow portion and accommodating the armature, a thermostatic switch carried on said base, said thermostatic switch being connected in circuit with one of said terminals, and means biasing the armature away from the coil, which biasing means is overcome by the action of the coil.

6. A motor starting and protective unit comprising a base, three terminals in the base, a plug, first, second and third terminal engaging elements carried by said plug and removably engageable with said terminals respectively, a relay switch in said plug comprising extensions from the first and second of said terminal engaging elements, movable switch contacts in the plug, a movable armature in said plug operating said contacts, an electromagnetic coil operative upon said armature, said coil being connected to the first and third of said terminal engaging elements, said base having an opening, an extension on said plug adapted to enter said opening, said extension forming a hollowing portion and accommodating the armature, a thermostatic switch carried on said base, said thermostatic switch being connected in circuit with one of said terminals, said thermostatic switch adapted to be connected in the circuit with the running winding of a motor, said first and second terminals adapted to be connected in the circuit with the starting winding of a motor, said electromagnetic coil adapted to be connected in the circuit with the running winding of said motor but not in circuit with the starting winding.

JOHN D. BOLESKY.
LEWIS W. BUELL.

REFERENCES CITED

The following references are of record in the file of this patent:

UNITED STATES PATENTS

| Number | Name | Date |
| --- | --- | --- |
| 2,306,810 | Jones | Dec. 29, 1942 |
| 1,943,240 | Lear et al. | Jan. 9, 1934 |
| 2,076,136 | Weed | Apr. 6, 1937 |
| 2,224,873 | Larson | Dec. 17, 1940 |
| 2,320,252 | Vaughan | May 25, 1943 |